United States Patent Office 3,358,442
Patented Dec. 19, 1967

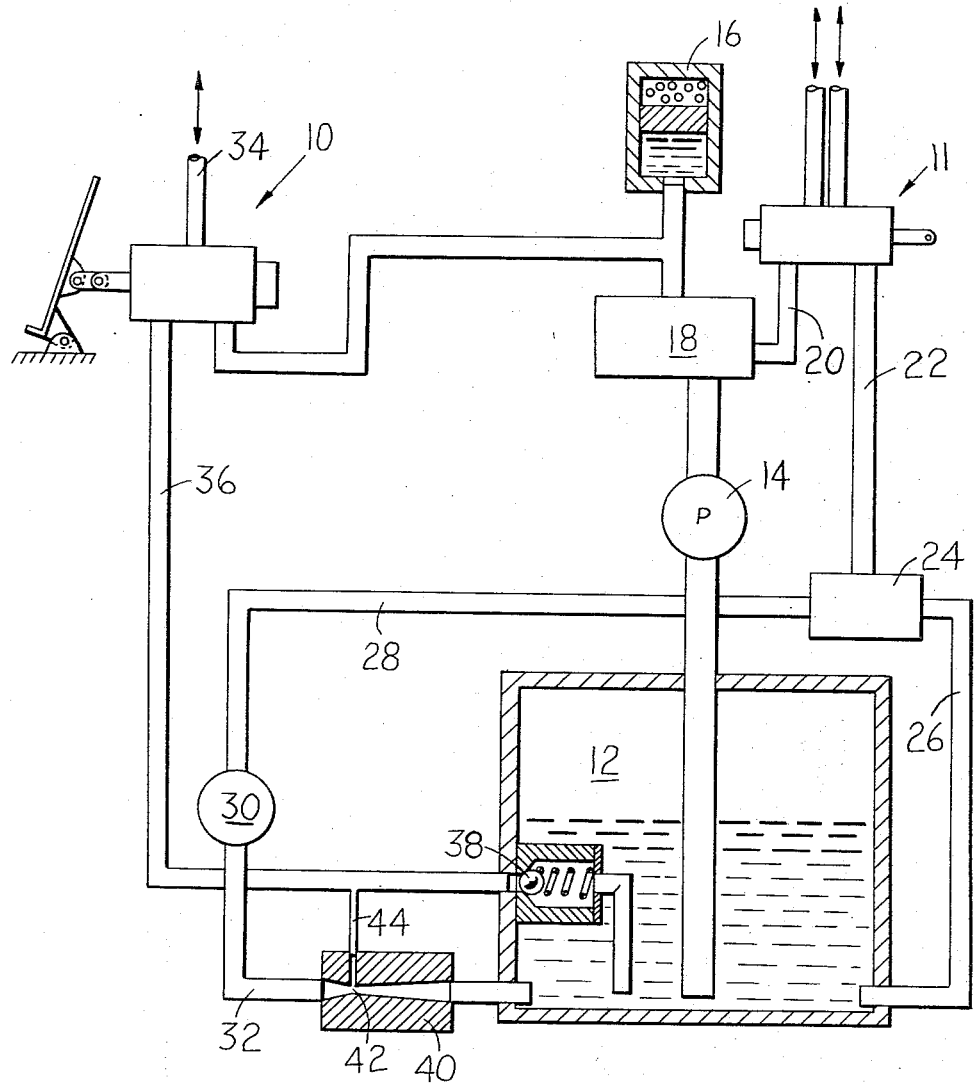

3,358,442
BRAKE HYDRAULIC CIRCUIT
John R. Cryder, Joliet, Ill., assignor to Caterpillar Tractor Co., Peoria, Ill., a corporation of California
Filed July 13, 1966, Ser. No. 564,954
3 Claims. (Cl. 60—52)

This invention relates to hydraulic circuits of the kind employed on vehicles and implements which have more than one component actuated from a common hydraulic circuit, and the invention pertains more particularly to means for returning fluid under relatively low pressure to a tank which might contain fluid at a higher pressure.

One example of a system in which the present invention proves useful is the hydraulic system of earthmoving equipment which has a common reservoir or tank and one or more pumps for directing fluid under pressure therefrom to multiple components such as brakes, steering cylinders and other devices. In such systems, the pumps are generally engine driven and operate continuously while the equipment is in use. Open center valves for steering and other components permit continuous circulation of fluid and a positive pressure is purposely maintained in the system at all times to insure against cavitation of the pumps and positive response of all components. Some components, typically brakes and clutches, are actuated by directing fluid into a cylinder through a line by means of which it must also return to the system and tank at the end of the actuating period. This fluid must, therefore, return against tank pressure which may be as great or greater than 10 p.s.i. and complete disengagement of the brakes or clutches is prohibited. This is particularly true where bladder type brake actuators are employed and heavy spring pressure is not available to insure disengagement.

It is an object of the present invention to provide means positively to insure disengagement of brakes or the like in systems such as described above, and particularly to provide means for causing fluid under low pressure in a brake return line to enter a tank containing fluid at a higher pressure.

Further objects and advantages of the invention and the manner in which it is carried into practice are made apparent in the following specification wherein reference is made to the accompanying drawing.

The drawing is a schematic view of a hydraulic system including brakes and other components which embodies the present invention.

A pedal actuated brake control system is generally indicated at 10 in the drawing and a manual control valve generally indicated at 11 may represent a steering valve or, in fact, the valves for more than one of the hydraulically actuated components not shown. Fluid under pressure is directed to the valve shown from a tank 12 as by a pump 14. As is customary in hydraulic brake systems, an accumulator 16 is provided to insure pressure for brake operation at all times, irrespective of whether the pump is being operated. A conventional accumulator charging valve 18 serves to direct fluid to the accumulator until a predetermined pressure is attained and then to direct fluid, as through a line 20, to the valve 11 or other valves controlling various other components. These valves are conventionally of the open center type and, unless manipulated to actuate a component, permit return of fluid as by a line 22 toward the reservoir or tank. This return fluid is intercepted by a flow control valve as indicated at 24 which directs some fluid, as by a line 26, directly to the tank and some, as by a line 28 through a heat exchanger or cooler 30 before it returns to the tank as by line 32. The purpose of the flow control valve is to limit flow through the cooler to a volume and pressure sufficiently low to prevent bursting of the cooler components. This also insures that a substantial flow is directed through the cooler and insures a relatively high velocity flow through the line between the cooler and the tank 12.

As heretofore pointed out, actuation of the brake control valve directs fluid under pressure to a cylinder or bladder through a line such as indicated at 34 which also serves as a return line upon closing of the brake valve and opening of a return passage therein. Thus, fluid under pressure at the brakes is intended to return through a line 36 and enter the tank 12 through a check valve here illustrated as a spring biased ball 38. One purpose of this check valve is to prevent tank pressure from entering the line 36 and passing through the open return passage of the brake valve to exert pressure on the brake which tends to urge it toward an applied position. This has been found, in some instances, to cause dragging of the brake which leads to overheating and to waste of power.

As is apparent from the arrangement shown, return fluid from the brakes must unseat the ball check 38 in order to enter the tank 12 and cannot ordinarily do so unless the pressure in line 36 exceeds that in the tank. Consequently, upon release of the brakes, sufficient pressure will often remain in the line 36 to cause excessive dragging. The present invention, therefore, provides a syphon or ejector 40 in the line 32. The operation of such syphons is well known and briefly comprises the creation of a high velocity flow through a restriction such as shown at 42, thus inducing a suction in the area surrounding the restriction and in a line 44 which communicates with the brake return line 36. As a result of this construction, the continuous relatively high velocity flow through the cooler system insures sufficient suction in the brake return line 36 to reduce the pressure therein to an acceptable level notwithstanding the higher pressure in tank 12 tending to retain the ball check 38 in its closed position.

I claim:

1. In a hydraulic circuit for serving multiple components of a vehicle in which at least one component is of the brake type in which brake release is accomplished by return flow of fluid from the brake to a tank and in which pump pressure is normally returned to the tank to maintain positive pressure in the tank, a brake return line, a pump pressure return line, and syphon means between said lines to insure delivery of fluid from the brake line to the tank.

2. The combination of claim 1, including a check valve to prevent flow from the tank to the brake return line, and said syphon being positioned to provide a bypass to the tank through the pump pressure return line.

3. The combination of claim 1, in which there are two pump pressure return lines, and a flow control valve insuring a minimum flow and velocity through the line housing the syphon.

No references cited.

EDGAR W. GEOGHEGAN, *Primary Examiner.*